Nov. 3, 1925.   1,559,908
C. A. PARSONS ET AL
MANUFACTURE OF GEAR WHEELS
Filed Oct. 23, 1924   5 Sheets-Sheet 2

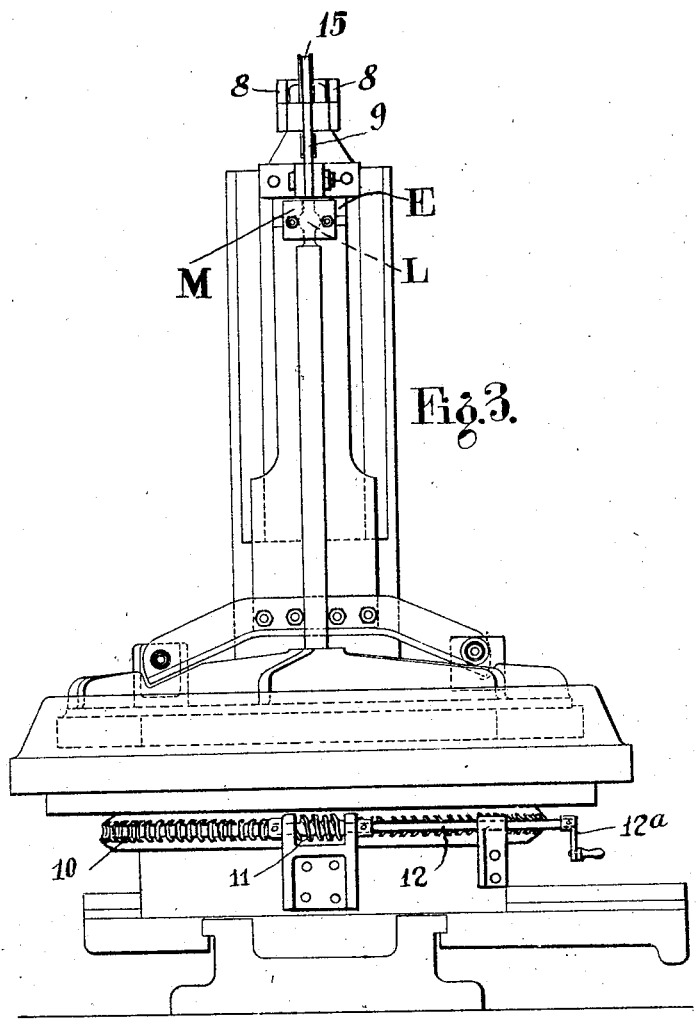

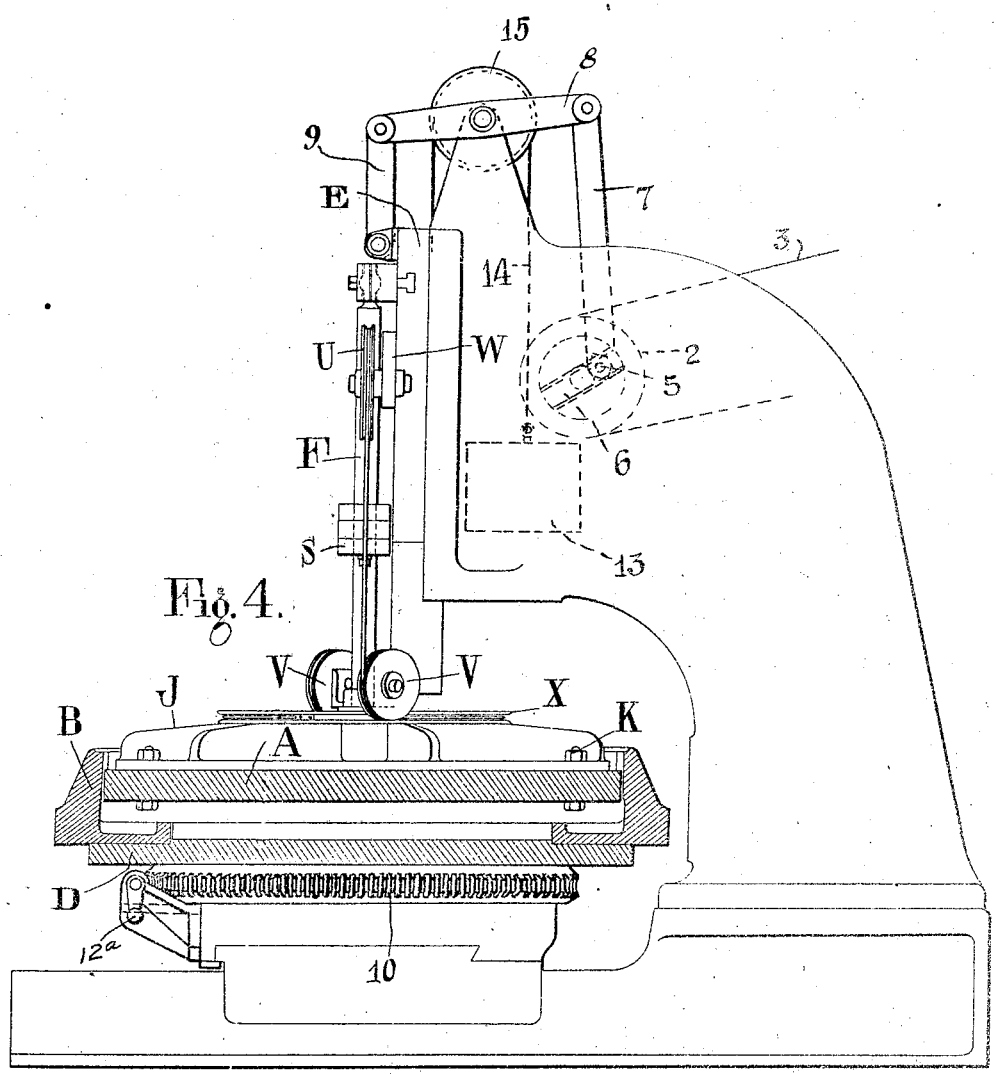

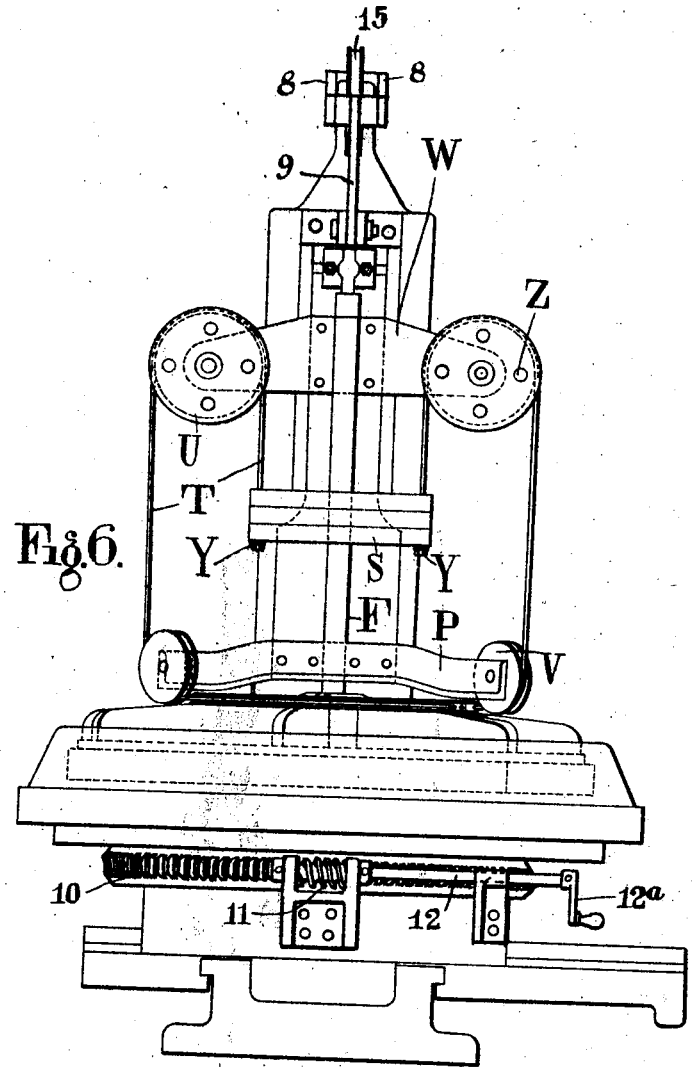

Patented Nov. 3, 1925.

1,559,908

UNITED STATES PATENT OFFICE.

CHARLES ALGERNON PARSONS, STANLEY SMITH COOK, AND JOHN FORD, OF NEW-CASTLE-ON-TYNE, ENGLAND; SAID COOK AND FORD ASSIGNORS TO SAID PARSONS.

MANUFACTURE OF GEAR WHEELS.

Application filed October 23, 1924. Serial No. 745,518.

*To all whom it may concern:*

Be it known that we, CHARLES ALGERNON PARSONS, STANLEY SMITH COOK, and JOHN FORD, all subjects of the King of Great Britain and Ireland, and all residing at Heaton Works, Newcastle-on-Tyne, in the county of Northumberland, England, have invented certain new and useful Improvements in and Relating to the Manufacture of Gear Wheels (for which application has been filed in Great Britain, under Serial Number 25,366, on Oct. 11, 1923), of which the following is a specification.

The invention relates to improvements in the manufacture of toothed gear wheels and has for its main object the production of such a wheel of a very high degree of accuracy either for use in gear drives or as a master wheel.

The present invention consists in the improved processes of finishing gear wheels hereinafter described and particularly pointed out in the claims.

A preferred form of the invention consists in placing the crown wheel over the wheel to be ground with means for maintaining their axes accurately parallel, fixing one or other of these two members, applying torque preferably through resilient means to the other member so as to bring the tooth faces of the two members into mutual contact and reciprocating one of the members relatively to the other in a longitudinal direction parallel to the axis. An abrasive material is preferably employed to expedite the grinding. After a certain amount of grinding in this fashion the angular position of the engagement is altered and a like amount of grinding done in a new relative angular position and so on in various positions, so that on the completion of the whole process the teeth on the wheel lie in close contact with those in the crown wheel in every position of engagement. The teeth of both gear wheel and lap, measured on the faces ground, will then be equally pitched around a common axis of rotation.

Subsequently torque is applied to the crown wheel in the opposite direction and the other set of tooth faces ground in a similar manner.

The method above described is not only applicable to spur gearing but also to helical gears, but in the latter case suitable means must be provided for giving the movable wheel not only a motion of translation parallel to the axis but also a motion of rotation.

Referring to the accompanying drawings:—

Figure 1:
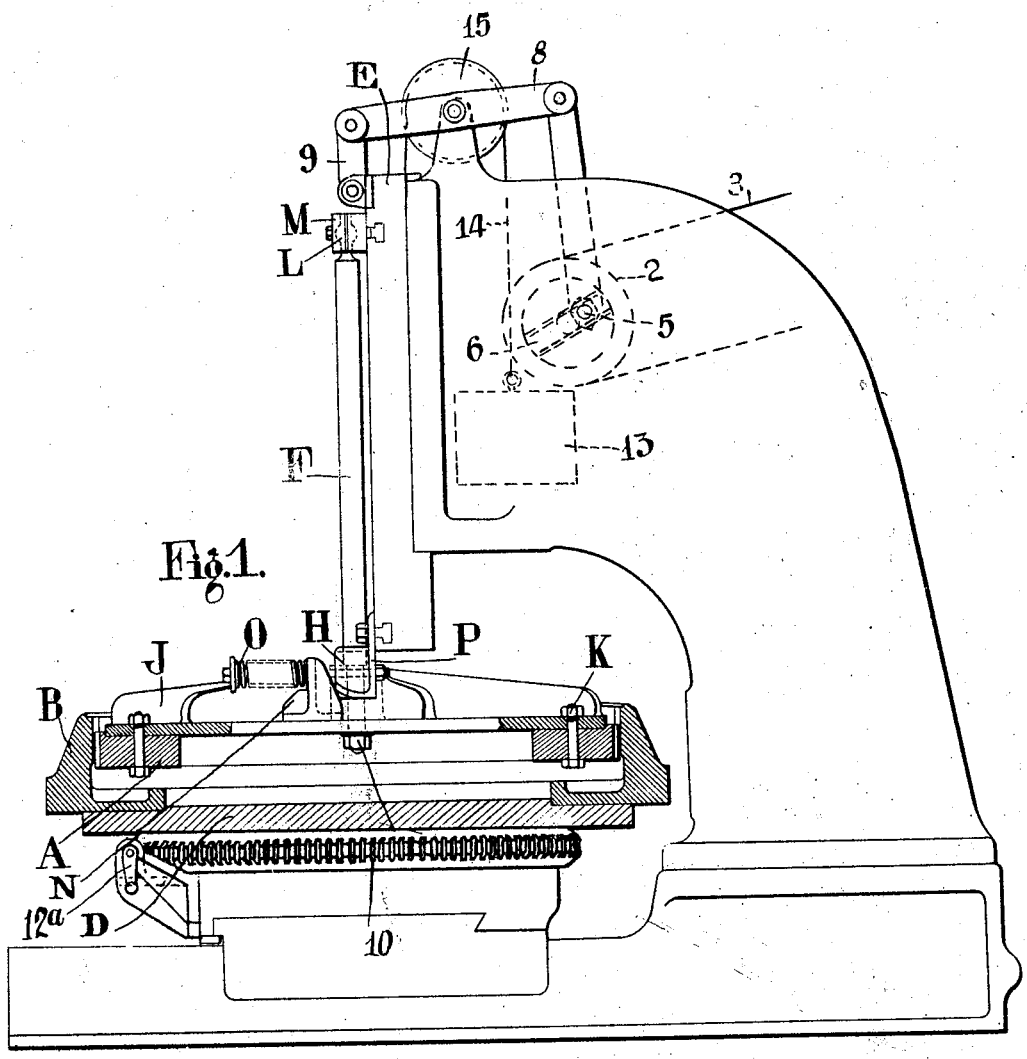
Figure 2:
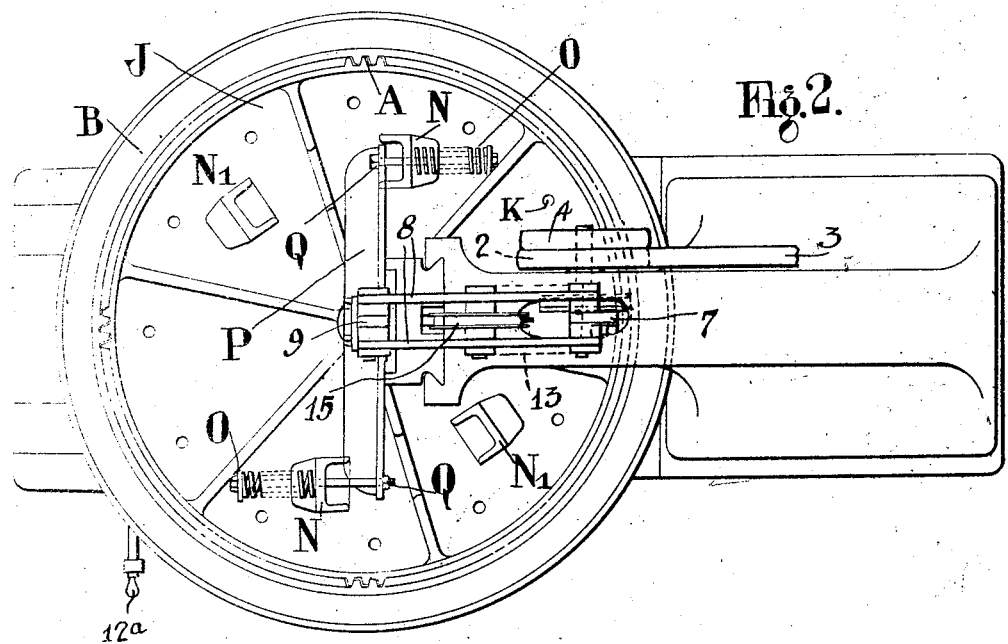

Figure 1 shows an elevation partly in section of one form of machine suitable for grinding the teeth of spur wheels according to the present invention;

Figure 2 being a plan, and

Figure 3 an end elevation, while

Figure 5:
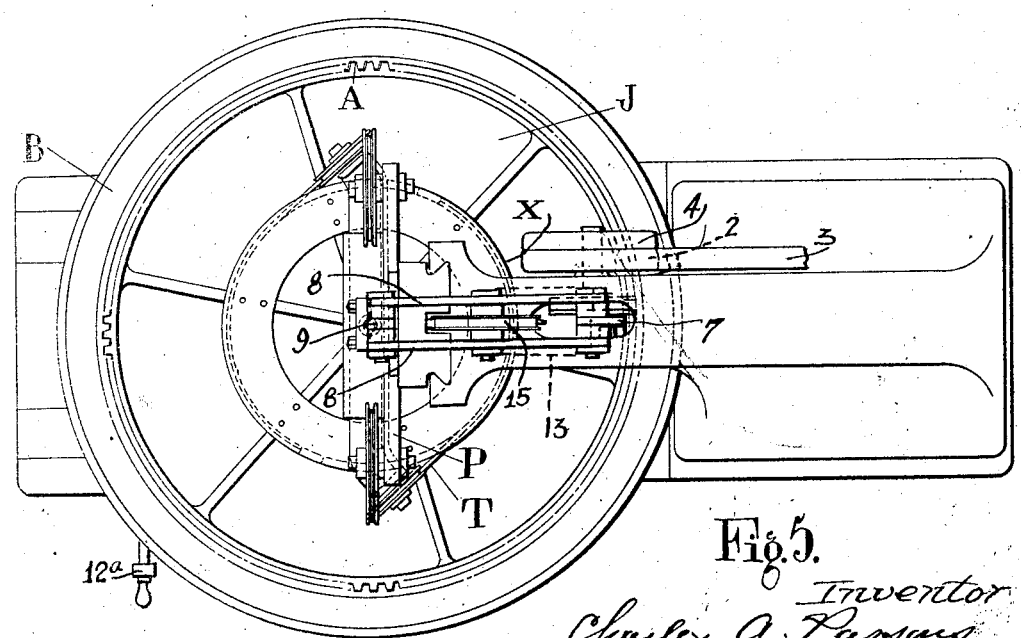

Figures 4, 5 and 6 are corresponding views of a modified form of machine adapted to grind the teeth of helical wheels.

Where desirable the same reference letters are used to denote corresponding parts in the different figures.

In order to carry into effect the preferred form of the invention described above the master spur wheel, A, to be ground is bolted to a carrier, J, (see Figures 1, 2 and 3) which is supported against a shoulder, H, by a nut, G, on the lower end of a rod, F; this rod is formed at its upper end with a ball, L, engaging with a bracket, M, carried by the head E of the machine, which may be reciprocated by any suitable means.

Thus, according to one form of such reciprocating means, a pulley, 2, rotatably mounted in the frame of the machine is driven by the belt, 3, the usual loose pulley, 4, being likewise provided. On the pulley, 2, is mounted a pin, 5, adjustable in the diametral groove, 6, the pin being connected by the link, 7, to one end of the rocking lever, 8, pivotally mounted on the frame of the machine, the other end of the lever being in turn connected by the link, 9, to the head, E, of the machine.

The counterpart of the wheel, A, namely the crown wheel, B, surrounding it, is secured to the base, D, of the machine by any suitable means, the teeth of the two gears A and B being equal in number and complementary in shape.

In order to apply torque to the wheel, A, a bracket, P, is bolted to the reciprocating head, E, while in addition brackets, N, N, are attached to the carrier, J. In association with each bracket, N, is a spring, O, which can be compressed by its nut, Q, so as to force the bracket, N, towards the end of the bracket, P, and so maintain the teeth of the wheel, A and B, in contact. Preferably the parts described are symmetrically arranged in duplicate so that a pure torque is provided.

Similar brackets, N', are provided for grinding the opposite faces of the teeth.

After disengagement of the spur wheel, A, and crown wheel, B, the latter is rotated into a new position for a further lapping operation by means of the worm-wheel, 10, mounted on the base, D, carrying the crown wheel, and actuated by the worm, 11, worm-shaft, 12, and hand-wheel 12$^a$.

In the form of the invention shown in Figures, 4, 5 and 6, suitable for grinding the teeth of the helical wheels, provision is made not only for the reciprocation but also for the rotary motion of the wheel, A. For this purpose the wheel, A, attached to the carrier, J, as before, and supported by the ball-and-socket bearing above is provided with a circular track, X. A cord, T, passes round this track over pulleys, U and V, attached respectively to brackets, W and P, on the reciprocating head, E, the other ends being secured to a counterweight, S. The arrangement of pulleys is duplicated at opposite points, the weight, S, preferably being common to the two cords, T. With this arrangement it will be seen that as the head, E, reciprocates a torque is imparted to the wheel, A, so as to keep its teeth in contact with those of the crown wheel, B, and permit it to reciprocate in a helical path.

In order to prevent the wheel, A, turning under the influence of the weight, S, when disengaged for the next operation holes, Z, may be provided in the pulleys, U, registering with similar holes in the bracket, W, so that bolts inserted through these holes will prevent the counterweight, S, from falling.

The whole weight of the reciprocating parts as common with machine tools is preferably balanced by the counter-weight, 13, acting by way of the rope, 14, and pulley, 15.

It is not necessary in accordance with the present invention that the inwardly projecting teeth of the crown wheel should be rigidly accurate in the first instance, though the greater the inaccuracies in the teeth of either wheel the more the grinding required to bring them both to accuracy.

Having now described our invention, what we claim as new and desire to secure by Letters Patent is:—

1. A method of finishing gear wheels according to which an internal gear wheel is disposed completely to encircle an external gear wheel, the teeth of said gear wheels being equal in number and complementary in shape, and said gear wheels by relative axial reciprocating motion are then subjected to a series of mutual grinding actions with intermediate circumferential adjustments to engage successively different teeth of said gear wheels, as set forth.

2. A method of finishing gear wheels according to which an internal gear wheel is disposed completely to encircle an external gear wheel, the teeth of said gear wheels being equal in number and complementary in shape, torque is applied to bring corresponding tooth faces of said gear wheels into operative contact, and said gear wheels by relative axial reciprocating motion are then subjected to a series of mutual grinding actions with intermediate circumferential adjustments to engage successively different teeth of said gear wheels, as set forth.

In testimony whereof we have signed our names to this specification.

CHARLES ALGERNON PARSONS.
STANLEY SMITH COOK.
JOHN FORD.